United States Patent [19]

Miller, Jr.

[11] 3,800,041
[45] Mar. 26, 1974

[54] ANALGESIC COMPOSITIONS AND METHODS
[75] Inventor: Joseph A. Miller, Jr., Indianapolis, Ind.
[73] Assignee: Eli Lilly and Company, Indianapolis, Ind.
[22] Filed: Mar. 2, 1971
[21] Appl. No.: 120,310

Related U.S. Application Data
[63] Continuation-in-part of Ser. No. 830,101, June 3, 1969, abandoned.

[52] U.S. Cl.................................. 424/273, 424/311
[51] Int. Cl............................................ A61k 27/00
[58] Field of Search.................... 424/273, 300, 311

[56] References Cited
UNITED STATES PATENTS
2,728,779   12/1955   Pohland........................... 260/326.3
3,161,654   12/1964   Shen et al........................... 424/274

OTHER PUBLICATIONS
American Drug Index, (1968) p. 173.
Merck Index, 8th Ed. (1968), p. 12–13.

Primary Examiner—Stanley J. Friedman
Attorney, Agent, or Firm—Kathleen R. Schmoyer; Everet F. Smith

[57] ABSTRACT

Improved analgesic compositions comprising, in combination, α-d-propoxyphene or a pharmaceutically acceptable acid addition salt thereof and indomethacin or a pharmaceutically acceptable cationic salt thereof; and methods of employing such improved analgesic compositions to obtain enhanced analgesia.

7 Claims, No Drawings

ANALGESIC COMPOSITIONS AND METHODS

CROSS-REFERENCE TO RELATED APPLICATION

This application is a continuation-in-part of my copending application Ser. No. 830,101, filed June 3, 1969 and abandoned after the filing of this application.

BACKGROUND OF THE INVENTION

This invention relates to analgesic compositions, and more particularly relates to improved analgesic compositions demonstrating enhanced activity.

It is known that certain esters of 1,2-diphenyl-2-hydroxy-3-methyl-4-(substituted)amino butanes and their pharmaceutically acceptable salts are effective analgesic agents. (See U.S. Pat. No. 2,728,779, issued Dec. 27, 1955). Included among each esters is α-d-1,2-diphenyl-2-propionyloxy-3-methyl-4-(dimethylamino)butane, commonly known as and hereinafter referred to as α-d-propoxyphene. α-d-Propoxyphene has been extensively used, typically in the form of a pharmaceutically acceptable acid addition salt, for the relief of pain. It is further known that α-d-propoxyphene is a non-addicting analgesic and, therefore, is greatly preferred over narcotic analgesic agents such as morphine. However, α-d-propoxyphene is not as potent an analgesic agent as is morphine and thus, for effective relief of severe pain, morphine or other narcotic analgesic agents have been adminstered. Thus, there has continued to exist a long-standing need for non-narcotic analgesic compositions approaching the potency of morphine. It is a primary object of this invention to provide such analgesic compositions.

SUMMARY OF THE INVENTION

This invention provides analgesic compositions and methods pf employing such compositions to relieve pain in warm-blooded animals. It has been found that the level of non-addictive analgesia obtained with α-d-propoxyphene or a pharmaceutically acceptable acid solution salt thereof can be enhanced, even to that of the narcotic agents. Such a result is achieved by combining α-d-propoxyphene or a pharmaceutically acceptable acid addition salt thereof with 1-(p-chlorobenzoyl)-5-methoxy-2-methylindole-3-acetic acid (commonly known as and hereinafter referred to as indomethacin) or a pharmaceutically acceptable cationic salt thereof. Indomethacin is known as an anti-inflammatory agent useful in the treatment of arthritic and dermatological disorders and like conditions which are generally responsive to anti-inflammatory agent (see U.S. Pat. No. 3,161,164, issued Dec. 15, 1964). Therefore, the enhanced analgesic effect observed by combining α-d-propoxyphene or a pharmaceutically acceptable salt thereof with indomethacin or a pharmaceutically acceptable cationic salt thereof is quite surprising and wholly unexpected.

DETAILED DESCRIPTION OF THE INVENTION

In the practice of the present invention, α-d-propoxyphene can be employed as the free base or as one of its pharmaceutically acceptable acid solution salts. Such salts are readily prepared by reacting the free amine with an organic or inorganic acid as taught in U.S. Pat. No. 2,728,779. Representative salts include the hydrochloride, hydrobromide, sulfate, nitrate, acetate, propionate, valerate, oleate, laurate, salicylate, benzoate, lactate, phosphate, tosylate, citrate, maleate, fumarate, succinate, tartrate, napsylate (salt of 2-naphthalenesulfonic acid), and the like.

Indomethacin can be employed as the free acid, or as one of its pharmaceutically acceptable cationic salts. Such salts are prepared in conventional procedures, by the reaction of the free acid with a selected base, as taught in U.S. Pat. No. 3,161,654. Representative salts include those identified in U.S. Pat. No. 3,161,654.

The following discussion of the practice of the present invention, for simplicity, refers to α-d-propoxyphene and indomethacin; however, this discussion is equally applicable to the practice of the present invention using a pharmaceutically acceptable acid addition salt of α-d-propoxyphene, or a pharmaceutically acceptable cationic salt of indomethacin.

Generally, in the practice of the present invention, the α-d-propoxyphene and indomethacin are employed in accordance with recognized techniques for the use of each substance, separately. Current medical practice with respect to the adminstration of α-d-propoxyphene is described in *Physicians' Desk Reference to Pharmaceutical Specialities and Biologicals* (for example, in the 25th Edition, published 1971, by Medical Economics, Inc., subsidiary of Litton Publications, Inc., Oradell, N.J., pages 836). Current medical practice with respect to the administration of indomethacin is likewise described in *Physicians' Desk Reference to Pharmaceutical Specialities and Biologicals* (for example, in the 25th Edition, published 1971, by Medical Economics, Inc., subsidiary of Litton Publications, Inc., Oradell, N.J., pages 947–48).

In the practice of the present invention, the α-d-propoxyphene and indomethacin are employed in combination in amounts selected with reference to the usual effective dosages for each substance, individually, in the respective species. Thus, the α-d-propoxyphene is employed in an amount which is analgesically effective, individually, or in such smaller amount as, in the presence of the indomethacin, is nonetheless analgesically effective for the particular species. Generally, the former practice, of the use of an amount analgesically effective if employed individually, is preferred, in that the resulting compositions with indomethacin can be used to relieve extremely severe pain. Typically, therefore, in the methods and compositions of the present invention, the α-d-propoxyphene is administered orally in an amount representing from about 50 to about 200 percent of the median dose which would be effective analgesically if the α-d-propoxyphene were administered alone. The indomethacin, in the methods and compositions of the present invention, is administered orally in an amount representing from about 50 to about 200 percent of the median dose which would be effective if administered alone as an anti-inflammatory agent. Higher or lower percentages may be preferred in the instance of administration by other routes.

As set forth above, medically effective dosages are well known for each of α-d-propoxyphene and indomethacin, when administered individually. Generally, the effective oral analgesic dose of α-d-propoxyphene hydrochloride, administered alone, ranges from about 32 mg. to 65 mg. Thus, the median effective unit dose is about 50 mg. for the hydrochloride. In the instance of indomethacin, the effective oral anti-inflammatory dose, when administered alone, ranges from about 25 to 65 mg. Thus, the median effective oral unit dose is about 45 mg. In all instances, of course, the dose may be administered on a plurality of occasions for continued pain relief.

Similarly, effective dosages are also known for the rat, which is the accepted experimental species for anti-inflammatory and analgesic effects. Generally, for α-d-propoxyphene hydrochloride, when administered alone, the effective oral analgesic dose ranges from about 8 to about 40 mg./kg. with a median effective dose of about 24 mg./kg.; and the effective subcutaneous analgesic dose ranges from about 4 to about 20 mg./kg., with a median effective dose of about 12 mg./kg. In the instance of indomethacin administered alone, by either the oral or subcutaneous route of administration, the effective anti-inflammatory dose ranges from about 0.5 to about 5.0 mg./kg., with a median effective dose of about 2.75 mg./kg.

In accordance with the present invention, the α-d-propoxyphene and indomethacin are administered in combination in the amounts as described above. Compositions comprising α-d-propoxyphene and indomethacin are preferably prepared in combination with adjuvants suitable for the particular route of administration desired. In the case of oral administration, the generally preferred route of administration, the substances can be combined with typical adjuvants in usual forms such as tablets, capsules, suspensions, elixirs, and the like. The substances can also be administered parenterally, as by intramuscular or subcutaneous administration, in accordance with standardized procedures for administration of pharmaceutical substances. The precise concentration of the α-d-propoxyphene and indomethacin in the formulation is not critical; more concentrated formulations are useful as concentrates for further dilution. However, it is preferred that the α-d-propoxyphene and indomethacin be present in a ratio, one to another, reflecting the ultimate unit dose. In medical practice in accordance with the present invention, a preferred composition is a pharmaceutical preparation in dosage unit form comprising, per dosage unit, an analgesically effective non-toxic amount within the range from about 25 to about 100 milligrams of α-d-propoxyphene or a pharmaceutically acceptable acid addition salt thereof and from about 25 to about 50 milligrams of indomethacin or a pharmaceutically acceptable cationic salt thereof, and a pharmaceutical diluent.

The compositions of this invention can be administered either intermittently, for isolated episodes of pain, or on a regular basis (i.e., every 4 to 6 hours), when pain persists over a period of time.

The following examples illustrate the present invention.

EXAMPLE 1:

A typical composition suitable for filling into gelatin capsules is prepared by thoroughly mixing 1 part by weight of α-d-propoxyphene hydrochloride, 1 part by weight of indomethacin, and 2 parts by weight of starch. The mixture is filled into No. 1 gelatin capsules in an amount such that each finished capsule contains about 32 mg. of α-d-propoxyphene hydrochloride and about 32 mg. of indomethacin.

If desired, the foregoing composition can be made to contain, in addition, about 10 parts by weight of acetylsalicylic acid, in which case each capsule will also contain about 320 mg. of acetylsalicylic acid.

EXAMPLE 2:

α-d-propoxyphene hydrochloride and indomethacin were evaluated separately and jointly in rats in a test method in which the reaction time of treated and untreated rats to the application of a heat stimulus to the rat tail was used to indicate the degree of analgesia. The test method employed is that described by Robbins (*Journal of the American Pharmaceutical Association*, Vol. 44, p. 479 [1955]).

Female Harlan strain albino rats, weighing between 70 and 80 grams, were fasted overnight prior to testing. Doses of 8 mg./kg. of α-d-propoxyphene hydrochloride were administered subcutaneously to groups of four rats. Rats in some dose groups additionally received a subcutaneous dose of indomethacin at 10 or 20 mg./kg. Additional groups of four rats received either α-d-propoxyphene hydrochloride or indomethacin alone, or saline solution. Pain reaction times were determined in the rat tail heat test at 30 and 60 minutes after treatment, and compared with saline treated control rats. A maximum cut-off time of 15 seconds was used to avoid damaging the rats' tails. Subcutaneous doses of indomethacin at 10 mg./kg. produced pain reaction times which were indistinguishable from the control values. The higher doses of indomethacin, 20 mg./kg., produced a trace of analgesia; but, when indomethacin was administered together with α-d-propoxyphene hydrochloride, the analgesic activity of α-d-propoxyphene hydrochloride was significantly enhanced.

The test results are summarized in Table I:

TABLE I

| Substance Adminstered | Pain Reaction Time (second) after | | | |
|---|---|---|---|---|
| | 30 min. | Increase over control | 60 min. | Increase over Control |
| Saline | 4.7 | | 4.4 | |
| α-d-Propoxyphene hydrochloride, 8 mg./kg. | 9.2 | 4.5 | 8.3 | 3.9 |
| Indomethacin, 10 mg./kg. | 5.4 | 0.7 | 5.3 | 0.9 |
| Indomethacin, 20 mg./kg. | 6.6 | 1.9 | 6.3 | 1.9 |
| 8 mg./kg. α-d-Propoxyphene hydrochloride + 10 mg./kg. indomethacin | 11.4 | 6.7 | 10.1 | 5.7 |
| 8 mg./kg. α-d-Propoxyphene hydrochloride + 20 mg./kg. indomethacin | 12.9 | 8.2 | 11.4 | 7.0 |
| Morphine, 2.0 mg./kg. | 11.5 | 6.8 | 8.1 | 3.7 |

At 10 mg./kg. indomethacin produced no significant analgesic effect. However, when combined with α-d-propoxyphene hydrochloride, the analgesic effect of propoxyphene hydrochloride was enhanced. At 20 mg./kg., indomethacin produced a trace of analgesia, but when combined with α-d-propoxyphene hydrochloride, produced a greater than additive analgesic effect.

EXAMPLE 3:

α-d-Propoxyphene and indomethacin were also evaluated under the same test method as in the preceding example except that administration was by the oral route, of groups of seven rats, and that the heat stimulus was of lesser intensity, thus resulting in longer periods for response in the control animals as well as in the treated animals. Evaluations were made only at thirty minutes after administration. The results are summarized in Table II:

TABLE II

| Substance Adminstered | Dose in mg./kg. | Pain Reaction Time (seconds) 30 min. after admin. |
|---|---|---|
| Evaluation I: | | |
| Saline (control) | — | 7.68±0.15 |
| Indomethacin | 1.5 | 7.61±0.11 |
| | 3.0 | 7.54±0.18 |
| | 6.0 | 7.75±0.05 |
| $\alpha$-d-Propoxyphene hydrochloride | 24 | 11.32±0.24 |
| $\alpha$-d-Propoxyphene hydrochloride | 24 | |
| Indomethacin | 1.5 | 12.89±0.39 |
| $\alpha$-d-Propoxyphene hydrochloride | 24 | |
| Indomethacin | 3.0 | 15.25±0.90 |
| $\alpha$-d-Propoxyphene hydrochloride | 24 | |
| Indomethacin | 6 | 18.46±0.98 |

I claim:

1. The method of obtaining enhanced analgesia which comprises administering to a warm-blooded animal a composition comprising, as a first component, an analgesically effective amount of $\alpha$-d-propoxyphene or a pharmaceutically acceptable acid addition salt thereof and, as a second component, an amount of indomethacin or a pharmaceutically acceptable cationic salt thereof which enhances analgesic effectiveness of the first component, said components being present in amounts representing a ratio of one part by weight of the first component, based $\alpha$-d-propoxyphene, to from 1.38 to 2.76 parts by weight of the second component, based on indomethacin.

2. The method of claim 1 wherein the administration is by the oral route.

3. The method of claim 2 wherein the first component is $\alpha$-d-propoxyphene hydrochloride and the second component is indomethacin.

4. The method of claim 2 wherein the first component is $\alpha$-d-propoxyphene napsylate and the second component is indomethacin.

5. The composition adapted to be administered to a warm-blooded animal to obtain enhanced analgesia which comprises, as a first component, an analgesically effective amount of $\alpha$-d-propoxyphene or a pharmaceutically acceptable acid addition salt thereof and, as a second component, an amount of indomethacin or a pharmaceutically acceptable cationic salt thereof which enhances analgesic effectiveness of the first component, said components being present in amounts representing a ratio of one part by weight of the first component, based on $\alpha$-d-propoxyphene, to from 1.38 to 2.76 parts by weight of the second component, based on indomethacin.

6. The composition of claim 5 wherein the $\alpha$-d-propoxyphene or pharmaceutically acceptable acid addition salt thereof is $\alpha$-d-propoxyphene hydrochloride.

7. The composition of claim 5 wherein the $\alpha$-d-propoxyphene or pharmaceutically acceptable acid addition salt thereof is $\alpha$-d-propoxyphene napsylate.

* * * * *